United States Patent
Godbaz et al.

(10) Patent No.: US 11,914,036 B2
(45) Date of Patent: Feb. 27, 2024

(54) PULSE WIDTH MODULATED INTEGRATION FOR TIME OF FLIGHT IMAGING

(71) Applicant: Microsoft Technology Licensing, LLC, Redmond, WA (US)

(72) Inventors: John Peter Godbaz, Sunnyvale, CA (US); Brock McCray Roland, San Bruno, CA (US); Rui Jin, Mountain View, CA (US); Minseok Oh, Santa Clara, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 547 days.

(21) Appl. No.: 17/125,638

(22) Filed: Dec. 17, 2020

(65) Prior Publication Data
US 2022/0201186 A1 Jun. 23, 2022

(51) Int. Cl.
*G01S 17/10* (2020.01)
*G01S 7/483* (2006.01)
*G01S 17/26* (2020.01)

(52) U.S. Cl.
CPC .............. *G01S 17/10* (2013.01); *G01S 7/483* (2013.01); *G01S 17/26* (2020.01)

(58) Field of Classification Search
CPC ........... G01S 6/483; G01S 7/483; G01S 17/10
See application file for complete search history.

(56) References Cited

U.S. PATENT DOCUMENTS

| 10,855,896 B1 | 12/2020 | Li et al. | |
|---|---|---|---|
| 2012/0098964 A1* | 4/2012 | Oggier | H04N 13/204 348/140 |
| 2016/0003946 A1* | 1/2016 | Gilliland | G01S 17/894 356/5.01 |
| 2016/0344965 A1* | 11/2016 | Grauer | H04N 25/135 |
| 2020/0018834 A1 | 1/2020 | Boutaud | |

(Continued)

OTHER PUBLICATIONS

"International Search Report and Written Opinion Issued in PCT Application No. PCT/US2021/058371", dated Feb. 18, 2022, 11 Pages.

*Primary Examiner* — Isam A Alsomiri
*Assistant Examiner* — Joseph C Fritchman
(74) *Attorney, Agent, or Firm* — Alleman Hall & Tuttle LLP

(57) ABSTRACT

One example provides a method of operating a time-of-flight camera system comprising an illumination source and an image sensor. The method comprises operating the illumination source and the image sensor to control a plurality of integration cycles and a plurality of readout cycles. In each integration cycle, the method comprises performing a plurality of pulse width modulated (PWM) illumination cycles where each PWM illumination cycle is separated from one or more adjacent PWM illumination cycles by a non-illumination cycle. For each PWM illumination cycle, the method comprises directing photocharge to in-pixel memory for each pixel that is performing image integration and for each non-illumination cycle conducting photocharge away from the in-pixel memory for each pixel that is performing image integration. The readout cycle comprises, for each pixel that performed image integration, reading a charge stored in the in-pixel memory after the integration cycle.

20 Claims, 8 Drawing Sheets

(56) References Cited

U.S. PATENT DOCUMENTS

| | | | |
|---|---|---|---|
| 2020/0158870 A1* | 5/2020 | Schumann | G01S 17/10 |
| 2021/0063576 A1* | 3/2021 | Gupta | G06T 7/521 |
| 2021/0116567 A1* | 4/2021 | Heinonen | G01S 7/4863 |

* cited by examiner

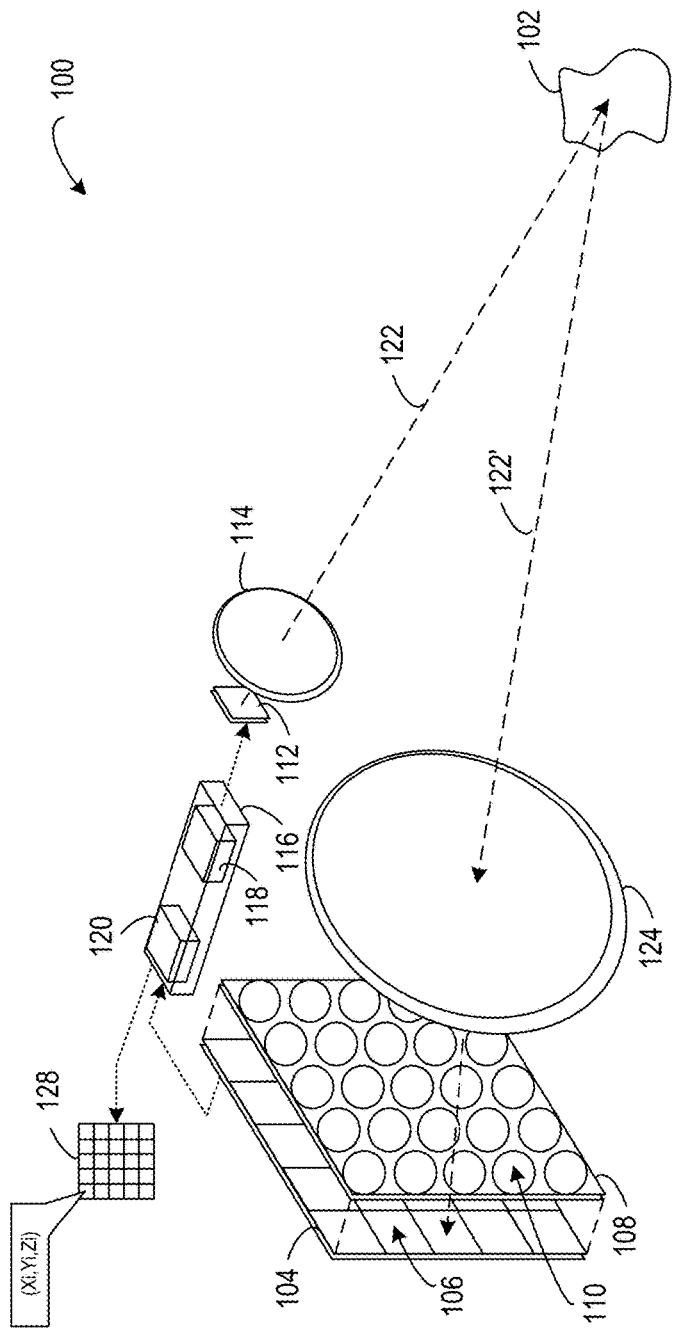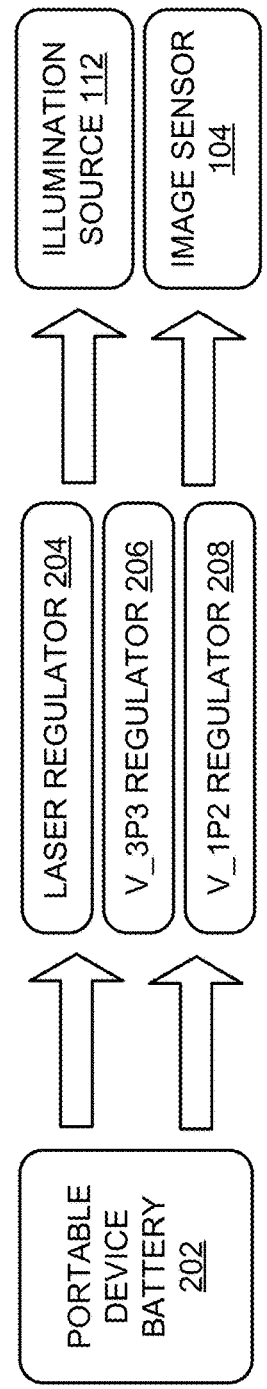

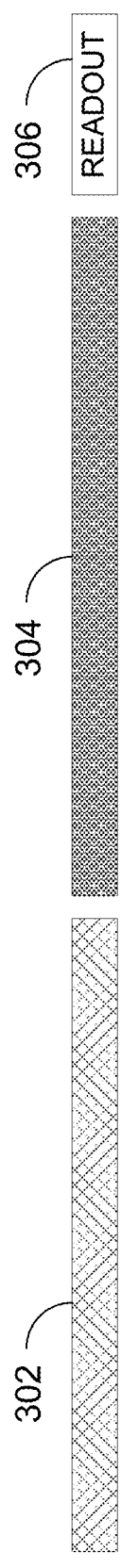
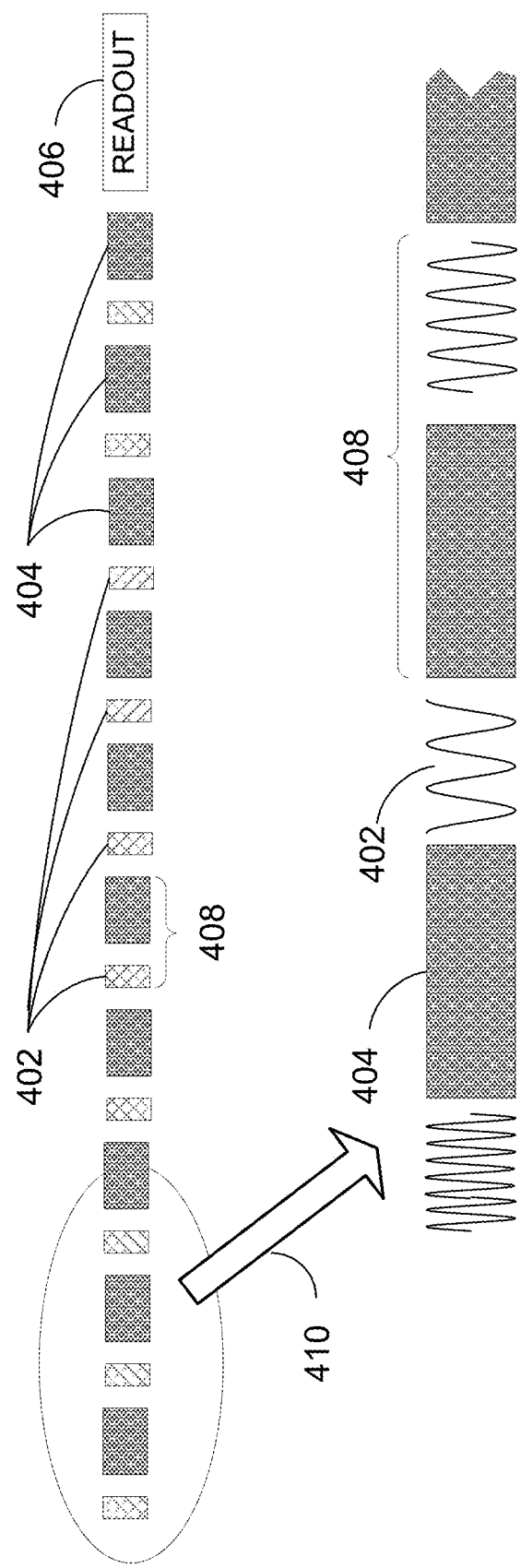
FIG. 3
FIG. 4

OPERATE ILLUMINATION SOURCE AND IMAGE SENSOR TO CONTROL A PLURALITY OF INTEGRATION CYCLES AND A PLURALITY OF READOUT CYCLES 902

DURING EACH INTEGRATION CYCLE, PERFORM PLURALITY OF PULSE WIDTH MODULATED (PWM) ILLUMINATION CYCLES EACH SEPARATED FROM ONE OR MORE ADJACENT PWM ILLUMINATION CYCLES BY A NON-ILLUMINATION CYCLE 904

PERFORM ONE OR MORE OF THE INTEGRATION CYCLES AT A FREQUENCY IN A RANGE OF BETWEEN 50 KHZ AND 5 MHZ 906

USE A FREQUENCY MODULATED LIGHT SIGNAL 908

FREQUENCY MODULATED LIGHT SIGNAL COMPRISES A RANDOM PHASE ENCODING 910

DURING EACH PWM ILLUMINATION CYCLE, DIRECT PHOTOCHARGE TO THE IN-PIXEL MEMORY FOR EACH PIXEL THAT IS PERFORMING IMAGE INTEGRATION 912

DURING EACH NON-ILLUMINATION CYCLE, CONDUCT PHOTOCHARGE AWAY FROM THE IN-PIXEL MEMORY FOR EACH PIXEL THAT IS PERFORMING IMAGE INTEGRATION 914

DRAIN PHOTOCHARGE VIA ANTI-BLOOMING GATE 916

918 DRAIN THE PHOTOCHARGE VIA RESET PATH 918

DURING EACH READOUT CYCLE, FOR EACH PIXEL THAT PERFORMED IMAGE INTEGRATION, READING A CHARGE STORED IN THE IN-PIXEL MEMORY AFTER THE INTEGRATION CYCLE 920

FIG. 9

PULSE WIDTH MODULATED INTEGRATION FOR TIME OF FLIGHT IMAGING

BACKGROUND

Time-of-flight (ToF) cameras determine a depth image by measuring, at each pixel of an image sensor of the camera, a round trip time of light between the camera and an object in a scene. For example, a ToF camera may emit a temporally-modulated light signal to illuminate the scene, and the image sensor captures reflected, phase-shifted signals at each pixel, from which depth is calculated.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Examples are disclosed that relate to the use of a pulse width modulated (PWM) image integration in a ToF camera. One example provides a method of operating a time-of-flight camera system comprising an illumination source and an image sensor. The image sensor comprises one or more sensor pixels each comprising an in-pixel memory. The method comprises operating the illumination source and the image sensor to control a plurality of integration cycles and a plurality of readout cycles. In each integration cycle, the method comprises performing a plurality of pulse width modulated (PWM) illumination cycles where each PWM illumination cycle is separated from one or more adjacent PWM illumination cycles by a non-illumination cycle. For each PWM illumination cycle, the method comprises directing photocharge to the in-pixel memory for each pixel that is performing image integration and for each non-illumination cycle conducting photocharge away from the in-pixel memory for each pixel that is performing image integration. The readout cycle comprises, for each pixel that performed image integration, reading a charge stored in the in-pixel memory after the integration cycle.

BRIEF DESCRIPTION OF THE DRAWINGS

FIG. 1 shows a schematic exploded view of an example time-of-flight (ToF) camera.

FIG. 2 shows a block diagram of an example power delivery scheme for an illumination source and an image sensor in a ToF camera.

FIG. 3 shows an example integration plan that does not utilize PWM illumination.

FIG. 4 shows an example integration plan that utilizes PWM illumination.

FIG. 9 shows a flow diagram depicting an example method of operating a ToF camera using a PWM image integration plan.

DETAILED DESCRIPTION

Figure 5A:
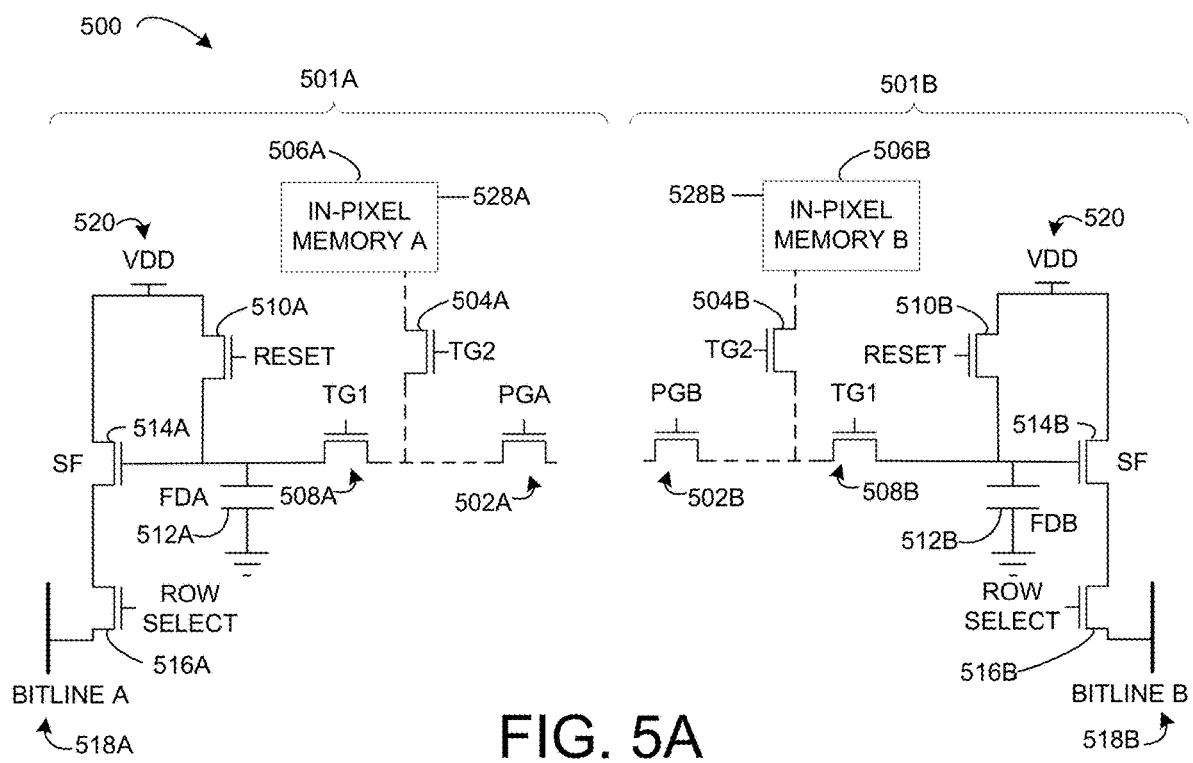
FIGS. 5A and 5B schematically show an example ToF camera pixel, and illustrate charge flow through the pixel during illumination and non-illumination cycles within an integration cycle.

A time-of-flight (ToF) camera determines a depth (a distance from camera to an object in a physical scene) for each pixel in an image sensor of the ToF camera. Some ToF cameras determine depth values by illuminating a physical scene with temporally modulated light, and calculating depth at each pixel based on a phase of the temporally modulated light received at that pixel. The determined depth values for each pixel in an image sensor of the camera are used to create a depth image of a scene.

The ability of a ToF camera to detect the received illumination light over ambient light and other noise sources, otherwise known as a signal-to-noise ratio (SNR), is a performance element of the ToF camera. Maintaining a desired SNR in high ambient light intensity or low signal conditions poses challenges. For example, one possible method to maintain a desired SNR in high ambient light conditions is to operate the temporally modulated light source at a higher power to thereby emit brighter illumination light. However, this may cause at times a high peak power draw. As ToF cameras can be implemented on mobile devices, such as handheld devices and wearable devices, such higher power operation may exceed battery bandwidth at times.

To avoid issues caused by the peak power exceeding battery bandwidth, an auxiliary voltage regulator with an auxiliary external capacitor can be used to store energy from the portable device power during lower power draw cycles and then use the stored auxiliary energy to supplement the device power during high peak power draw cycles. In some implementations this capacitor is charged up to a relatively high voltage during idle time and discharged during peak power consumption of the ToF camera. However, the addition of the auxiliary voltage regulator and auxiliary capacitor adds weight, size, and cost to the ToF camera, and thus may be undesirable for use in many portable devices where ToF cameras are deployed.

Accordingly, examples are disclosed that relate to using a pulse width modulated (PWM) image integration plan to address such peak power issues. Briefly, the disclosed examples divide an image integration cycle into smaller segments of illumination cycles and non-illumination cycles such that performing image integration consumes power that is manageable within a power bandwidth of the device power source, without using a separate storage capacitor and a special voltage regulator. To further help maintain SNR performance, the ToF camera may be configured, during non-illumination periods between PWM image integration, to direct photocharge from the reflected light away from a storage element within the ToF image sensor, thereby avoiding integrating photocharge during non-illumination cycles within an integration cycle.

FIG. 1 shows one example of a ToF camera system. The term 'camera' refers herein to any imaging component having at least one optical aperture and sensor array configured to image a scene 102. ToF camera 100 includes an image sensor 104, comprising an array of individual sensor pixels 106. Each sensor pixel 106 may further include a plurality of pixel taps, or detection units that each detect samples of incident light. Each pixel tap comprises in-pixel memory that stores charge generated during image integration. In some implementations, the pixels may be complementary metal-oxide semiconductor (CMOS) elements, but other suitable architectures are also envisaged. Each pixel may be responsive to light over a broad wavelength band, although this is not required.

Microlens array 108 may optionally be arranged over sensor array 104. Microlens array 108 includes a plurality of microlens elements 110. When included, microlens array 108 may provide a larger effective fill factor at each of the pixels, for increased collection efficiency and reduced crosstalk between pixels.

The ToF camera illumination source 112 is configured to emit near infrared (NIR) light to illuminate scene 102, in one embodiment. Other embodiments may use far IR light, or any other suitable wavelength of light. Optionally, illumination source 112 may include a diffuser 114 to cover a field of illumination of illumination source 112.

Electronic controller 116 may include a logic machine and an associated storage machine. The storage machine may hold instructions that cause the logic machine to enact any operation, algorithm, computation or transformation disclosed herein. Electronic controller 116 includes ToF controller machine 118 and input/output machine 120 that may be operatively connected to image sensor 104 and/or illumination source 112. Machines 118 and 120 may be implemented as separate physical hardware and/or firmware, incorporated into a single hardware and/or firmware component, or any suitable combination therein.

ToF controller machine 118 is configured to repeatedly activate illumination source 112 and synchronously control image sensor 104 to sense an image. Light signal 122 emitted from illumination source 112 is temporally modulated at one or more frequencies, and may optionally be configured to have a random phase encoding. The random phase encoding may help to reduce signal interference between two devices comprising similar ToF camera systems that are in proximity to each other. In the illustrated example of FIG. 1, ToF controller machine 118 activates illumination source 112 to illuminate scene 102 with NIR light signal 122. Light signal 122 reflects from scene 102 and reflected light 122' passes through receiving optics (illustrated schematically at 124) and is incident on image sensor 104. Sensor pixel 106 integrates photocharge arising from reflected light 122'. Optical filters can be used to reduce noise arising from ambient light.

ToF controller machine 118 is configured to generate a depth image 128 based on frames of image data acquired by image sensor 104 at a plurality of different phases of illumination light for each modulation frequency used. The term 'depth image' refers to an array of individually addressable image pixels ($X_i$, $Y_i$) registered to corresponding regions of an imaged scene. A depth value $Z_i$ indicates, for each image pixel, the depth of the corresponding region. 'Depth' is defined as a coordinate parallel to the optical axis of the camera, which increases with increasing distance from the camera.

FIG. 2 depicts a block diagram of an example power delivery system 200 suitable for use with a ToF camera. Power delivery system 200 can be used to provide power for illumination source 112 and image sensor 104. Power delivery system 200 comprises a portable device battery 202 that provides power to a laser voltage regulator 204, and image sensor voltage regulators 206, 208 that are configured to provide regulated voltages to illumination source 112 and image sensor 104. In some implementations, regulators 204, 206 and 208 may include appropriate decoupling capacitance and additional components to adjust the power supply bandwidth. Power delivery system 200 omits a separate external storage capacitor and associated special voltage regulator for meeting peak power loads. Instead, as mentioned above, a PWM image integration scheme can be used to help ensure that power delivery system 200 supplies power for illumination source 112 and image sensor 104 within the peak power limitations of portable device battery 202. Thus PWM illumination and image integration plan may be performed without the use of an additional capacitor and any associated regulator to store charge for periods of high peak power.

FIG. 3 shows an integration plan that does not utilize PWM, and that may suffer from such high peak power issues. Integration plan 300 comprises illumination cycle 302 and readout cycle 306. In some examples, non-illumination cycle 304 may be optionally included, e.g. as an anti-blooming cycle. To improve SNR, increasing an intensity of an illumination light source may draw a high peak power during the illumination cycle and cause an undesirable brown-out of the ToF camera system in the absence of an auxiliary capacitor to store additional charge for periods of peak power.

In contrast, FIG. 4 shows an integration plan 400 that utilizes a plurality of pulse width modulated (PWM) illumination cycles 402 to reduce a peak power draw. Each PWM illumination cycle 402 is separated by a non-illumination cycle 404. Together PWM illumination cycle 402 and non-illumination cycle 404 form integration cycle 408. In some implementations, the illumination and non-illumination cycles may be of different lengths and may change over time, so the length of an integration cycle 408 may not be consistent. A series of integration cycles 408 can be performed to capture a similar amount of light from scene 102 as integration plan 300, while each integration cycle 408 can operate within a peak power bandwidth of power delivery system 200, as internal capacitance of the ToF camera system stores sufficient charge to meet power requirements during each PWM illumination cycle 402. In some examples, each PWM illumination cycle 402 utilizes frequency modulated light. In other examples, each PWM illumination cycle 402 uses amplitude modulated light. Further, as mentioned above, to avoid interference issues with other ToF cameras in a use environment, each PWM illumination cycle 402 can utilize a random phase encoding. PWM illumination cycles 402 may operate at any suitable frequency. In some examples, suitable frequencies for the amplitude modulation of the illumination within PWM illumination cycles 402 may include those in a range of between 10 MHz and 500 MHz. The frequency of the integration cycle 408 may operate at any suitable frequency—in some implementations, an integer number of illumination pulses is contained within each PWM illumination cycle 402. In some examples, the frequency of the integration cycle 408 may include those in a range of between 50 kHz and 5 MHz.

PWM ToF image integration can be used with any suitable ToF image sensor pixel architecture. FIG. 5A schematically shows one example sensor pixel 500 suitable for use as pixel 106 in FIG. 1. Pixel 500 comprises two taps, 501A and 501B, each comprising in-pixel memory 506A and 506B (e.g. a capacitor) in which to store photocharge generated during image integration. In one example, the in-pixel memory may comprise a dedicated storage element such as a capacitor. In another example, the in-pixel memory may comprise a floating diffusion capacitor configured for reading out charge in addition to accumulating charge during integration. Each tap further comprises a pixel clock gate 502A, 502B to control the flow of photocharge to taps 501A, 501B during image integration, and to drain photocharge generated during non-image-integration periods, as described in more detail below.

Taps 501A, 501B respectively further include first transfer gates TG1 508A, 508B and second transfer gates TG2 504A, 504B. Second transfer gates 504A, 504B respectively control the flow of photocharge from a bulk photocharge generation region of the pixel to the corresponding in-pixel memory 506A, 506B for taps 501A, 501B. First transfer gates 508A, 508B respectively control the flow of photocharge to readout nodes, which respectively comprise floating diffusion capacitors 512A, 512B. Taps 501A, 501B further respectively include reset transfer gates 510A, 510B, source follower gates 514A, 514B, and row-select gates 516A, 516B. The reset gates 510A, 510B are connected between respective floating diffusion capacitors 512A, 512B and a power supply VDD 520, to enable the photocharge to discharge to the power supply 520 during a reset mode. The row-select gate 516A, 516B control reading of the photocharge stored on floating diffusion capacitor 512A, 512B across source follower gates 514A, 514B via bitlines 518A, 518B.

Figure 5B:
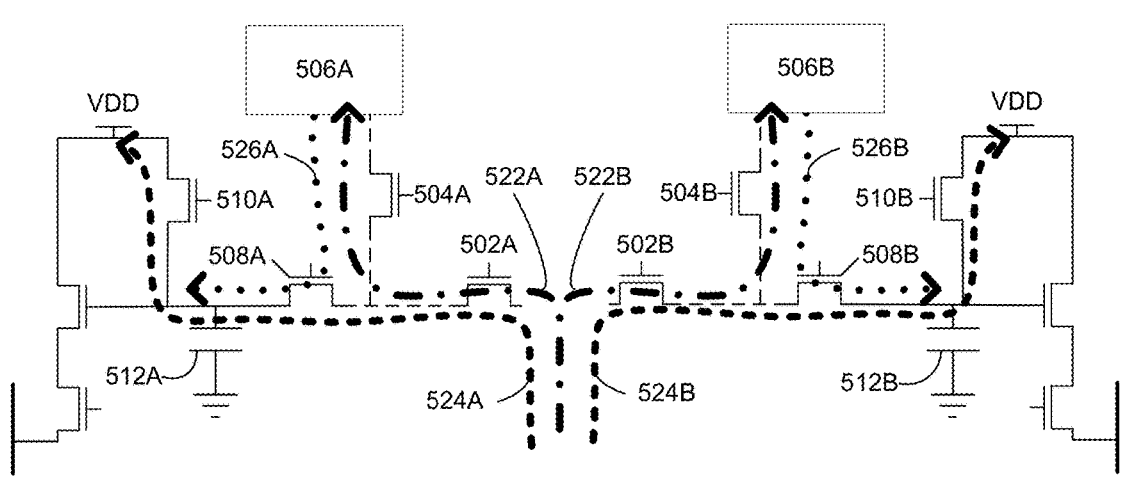
Figure 6:
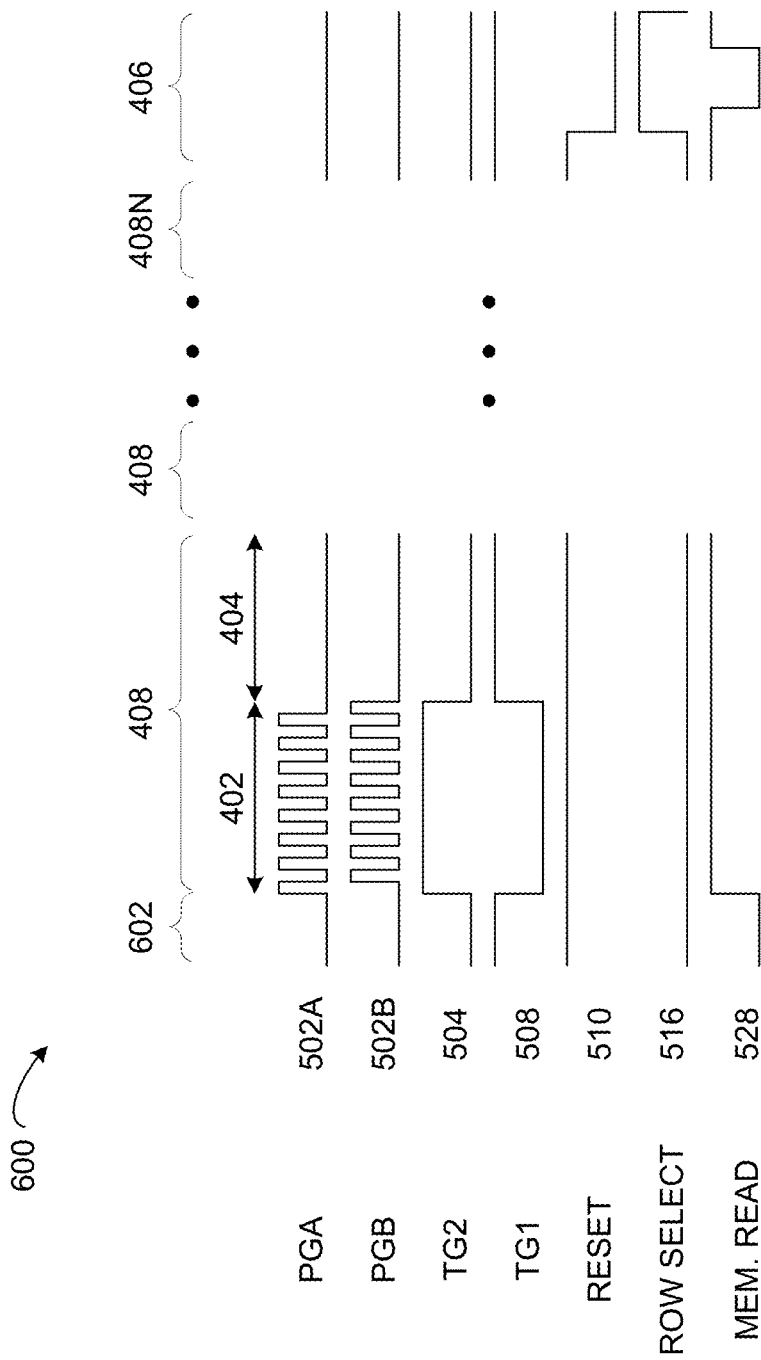
FIG. 6 shows an example timing diagram for operation of the pixel of FIGS. 5A and 5B.

FIG. 5B illustrates flow paths of photocharge through pixel 500, and FIG. 6 depicts a timing diagram 600 to implement the flow paths of photocharge shown in FIG. 5B. In the timing diagram 600, the timing for each gate in circuit 500 is labeled with the numbers for circuit components used in FIGS. 5A and 5B, but omits the A, B tap labels where the corresponding gate operates according to the same timing in each tap. Further, numbers from FIG. 4 are used to indicate how the different phases of operation shown in FIG. 6 correspond to the illumination and non-illumination cycles of FIG. 4.

Referring to FIG. 6, during illumination cycle 402, for each pixel that performs image integration, pixel clock gates 502A and 502B are modulated to alternately integrate photocharge at tap 501A and tap 501B respectively, while illumination source 112 is illuminating scene 102 according to plan 400. During this period, second transfer gates 504A, 504B and first transfer gates 508A, 508B are each operated to direct charge to in-pixel storage 506A, 506B, as indicated by paths 522A and 522B in FIG. 5B. Next, during non-illumination cycle 404, illumination light source 112 is turned off, the modulation of pixel clock transfer gates 502A and 502B is ceased after allowing the last reflected light 122' to return from scene 102, and second transfer gates 504A, 504B are held low to retain the integrated photocharge within in-pixel memory 506A, 506B. Further, first transfer gates 508A, 508B are operated together with reset gates 510A, 510B to drain photocharge that is generated during the non-illumination cycle 404. This is indicated as paths 524A and 524B in FIG. 5B, and helps to prevent photocharge generated by ambient light during the non-illumination period 404 from contributing noise and degrading the SNR of the depth image 128 being integrated. Integration cycle 408 is repeated N times prior to readout. Each illumination cycle allows additional photocharge to be generated from illumination source 112. Each non-illumination cycle helps to avoid an undesirably high peak power as seen at the battery as illumination source 112 and pixel 500 are in a lower power state, while also avoiding integrating noise due to ambient light. After N integration cycles 408, photocharge is read out during readout cycle 406, via paths 526A, 526B of FIG. 5B by transferring photocharge from in-pixel storage 506A, 506B to floating diffusion capacitors 512A, 512B, and reading a voltage at bitlines 518A, 518B by operating row-select gates 516A, 516B. In some examples, readout cycle 406 may occur an arbitrary time after the N integration cycles 408 have completed. Timing diagram 600 further includes a reset cycle 602, where pixel 500 can be set in a reset mode. Timing diagram 600 illustrates one set of example configurations for pixel 500 in PWM illumination cycle 402, non-illumination cycle 404, readout cycle 406, and reset cycle 602. Other sets of configurations may be possible.

Figure 7:
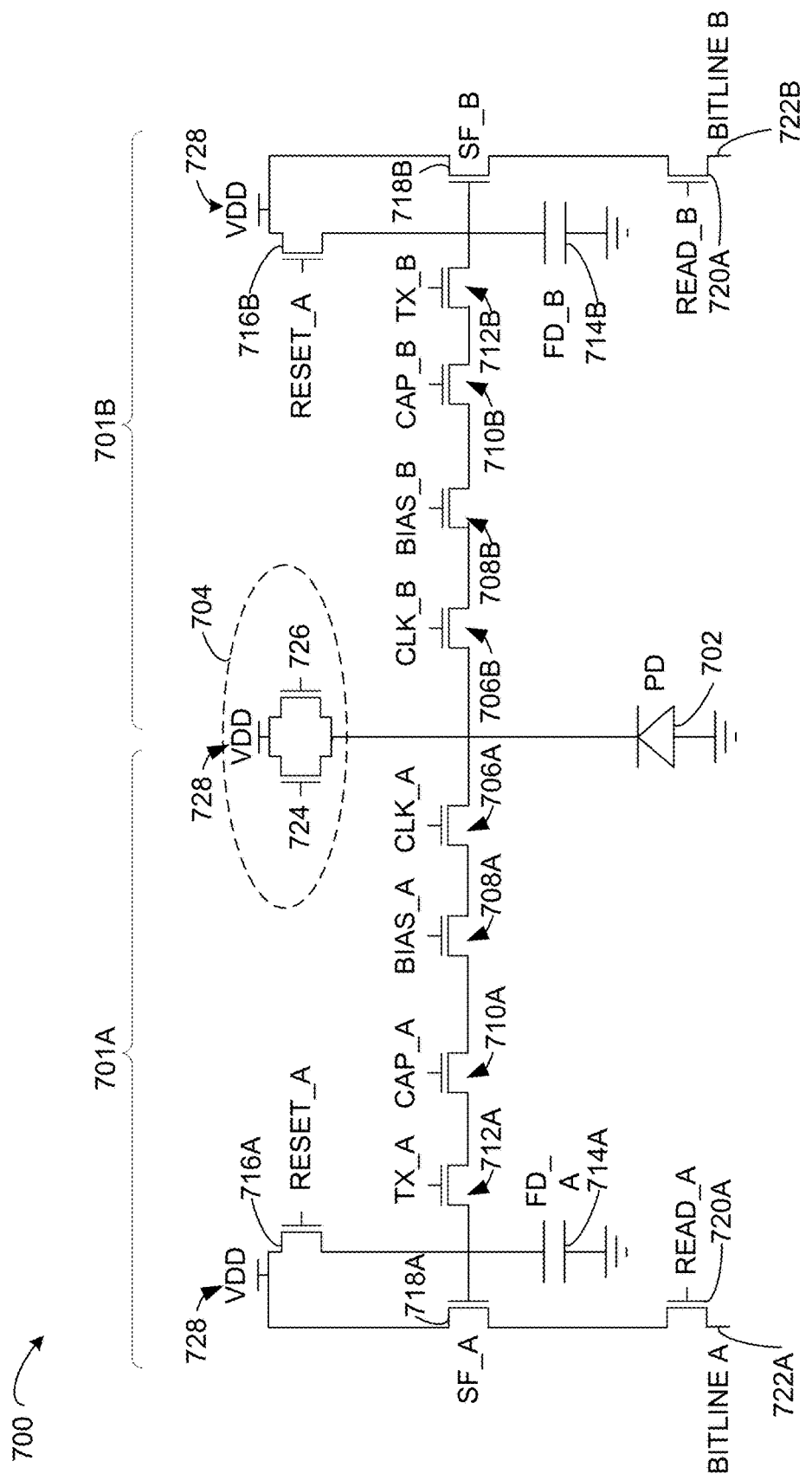
FIG. 7 schematically shows another example ToF pixel.

FIG. 7 schematically shows another example sensor pixel 700 that can be used with PWM ToF image integration. Pixel 700 is another example that is suitable for use as pixel 106 in FIG. 1. Pixel 700 comprises an anti-blooming circuit 704, and two taps 701A and 701B each comprising an in-pixel memory element (capacitor 710A, 710B) for storing photocharge generated during image integration. Each pixel 700 further comprises pixel clock gates 706A, 706B to control the flow of photocharge to taps 701A, 701B during image integration.

Tap 701A, 701B include respective bias gates 708A, 708B and Tx transfer gates 712A, 712B. Pixel clock gates 706A, 706B, bias gates 708A, 708B, and Tx transfer gates 712A, 712B are operable to control the flow of photocharge from photodetector PD 702 to corresponding in-pixel memory elements 710A, 710B for taps 701A, 701B. In some examples, photodetector PD 702 may comprise a photodiode, while in other examples photodetector PD 702 may comprise a photogate. Pixel 700 further includes reset gates 716A, 716B, source follower gates 718A, 718B, and read gates 720A, 720B. The reset transfer gates 716A, 716B are connected between respective FD capacitors 714A, 714B, and power supply VDD, 728, and are configured to discharge photocharge to power supply 728, for example after a reading. The read gates 720A, 720B are operable to control reading of the photocharge on respective FD capacitors 714A, 714B across source follower gates 718A, 718B via bitlines 722A, 722B.

Figure 8:
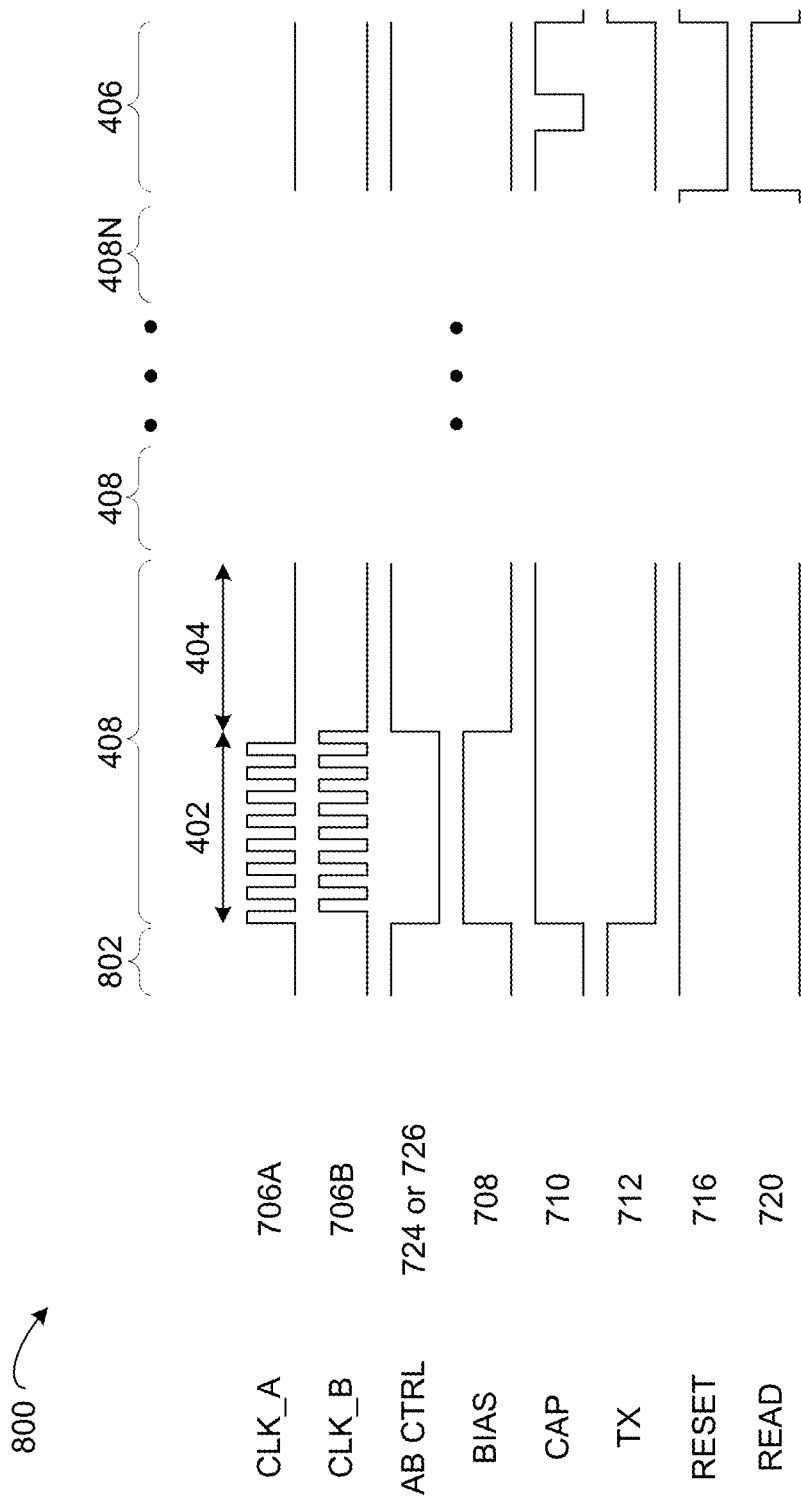
FIG. 8 shows an example timing diagram for the pixel of FIG. 7.

FIG. 8 depicts an example timing diagram 800 for operating pixel 700. Each timing line is labeled using the circuit element numbers from FIG. 7, but omitting the A, B tap labels where the corresponding gate operates according to the same timing in each tap. Numbers from FIG. 4 indicate how the different phases of operation shown in FIG. 8 correspond to the illumination 402 and non-illumination 404 cycles of the integration cycle 408 of FIG. 4.

Referring to FIG. 8, during illumination cycle 402, for each pixel that performs image integration, clock gates 706A and 706B are modulated to alternately integrate photocharge at tap 701A and tap 701B of pixel 700 respectively, while illumination source 112 is illuminating scene 102 according to plan 400. During this period, bias gates 708A, 708B, capacitor gates 710A, 710B, and Tx transfer gates 712A, 712B are each operated to direct charge to corresponding capacitor gates 710A, 710B. Next, during non-illumination cycle 404, illumination light source 112 is turned off (as shown in FIG. 4), the modulation of clock gates 706A and 706B is ceased after allowing the last reflected light 122' to return from scene 102, and then held low. Further, anti-blooming gates 726 and 724 are operated to drain photocharge that is generated during non-illumination cycle 404 towards power supply VDD 728. This helps to prevent photocharge generated by ambient light during the non-illumination cycle 404 from contributing noise and degrading the SNR of the depth image 128 being integrated. Integration cycle 408 is repeated N times prior to readout cycle 406. Each illumination cycle 402 of integration cycle 408 allows additional photocharge to be generated from illumination source 112, while each non-illumination cycle 404 helps to avoid an undesirably high peak power by configuring illumination source 112 and pixel 700 to be in a lower energy state and also to avoid integrating noise due to ambient light. After N integration cycles 408, photocharge is read out during readout cycle 406. Anti-blooming gates 724 and/or 726 are set to drain photocharge generated during the readout cycle 406. Timing diagram 800 illustrates one set of example configurations for pixel 700 in PWM illumination cycle 402, non-illumination cycle 404, readout cycle 406, and reset cycle 602. Other sets of example configurations also may be used.

FIG. 9 is a flow diagram depicting example method 900 for operating a ToF camera using a PWM image integration plan. For example, method 900 may be performed on the ToF cameras of FIG. 1-2 using any of the pixels shown in FIG. 5-8 as described herein. Method 900 comprises, at 902, operating an illumination source and image sensor to control a plurality of integration cycles and a plurality of readout cycles. In the plurality of integration cycles, method 900 comprises, at 904, during each integration cycle, performing plurality of pulse width modulated (PWM) illumination cycles each separated from one or more adjacent PWM illumination cycles by a non-illumination cycle. As indicated at 906, in some examples the one or more of the integration cycles may be performed at a frequency in a range of between 50 kHz and 5 MHz. In some examples, method 900 may comprise, at 908, use a frequency modulated light signal. Further, in some examples, as indicated at 910, the frequency modulated light signal may comprise a random phase encoding.

During each PWM illumination cycle, as indicated at 912, method 900 comprises directing photocharge to the in-pixel memory for each pixel that is performing image integration, and at 914, during each non-illumination cycle, conducting photocharge away from the in-pixel memory for each pixel that is performing image integration. In some examples, conducting photocharge away from the in-pixel memory may comprise, at 916, draining the photocharge via an anti-blooming gate. In other examples, conducting photocharge away from the in-pixel memory may comprise, at 918, draining the photocharge via a reset path. At 920, method 900 comprises during each readout cycle, for each pixel that performed image integration, reading a charge stored in the in-pixel memory after the integration cycle.

In some embodiments, the methods and processes described herein may be tied to a computing system of one or more computing devices. In particular, such methods and processes may be implemented as a computer-application program or service, an application-programming interface (API), a library, and/or other computer-program product.

Figure 10:
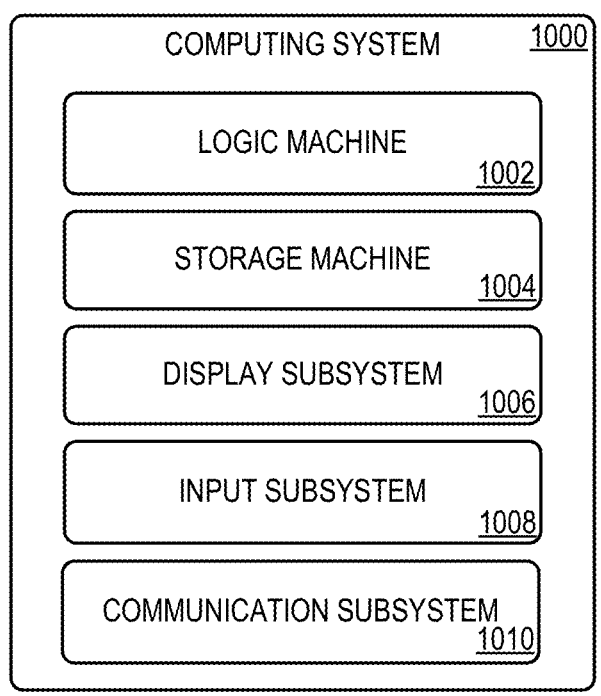
FIG. 10 shows a block diagram of an example computing device.

FIG. 10 schematically shows a non-limiting embodiment of a computing system 1000 that can enact one or more of the methods and processes described above. Computing system 1000 is shown in simplified form. Computing system 1000 may take the form of one or more personal computers, server computers, tablet computers, home-entertainment computers, network computing devices, gaming devices, mobile computing devices, mobile communication devices (e.g., smart phone), and/or other computing devices.

Computing system 1000 includes a logic machine 1002 and a storage machine 1004. Computing system 1000 may optionally include a display subsystem 1006, input subsystem 1008, communication subsystem 1010, and/or other components not shown in FIG. 10.

Logic machine 1002 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 1004 includes one or more physical devices configured to hold instructions executable by the logic machine to implement the methods and processes described herein. When such methods and processes are implemented, the state of storage machine 1004 may be transformed—e.g., to hold different data.

Storage machine 1004 may include removable and/or built-in devices. Storage machine 1004 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 1004 may include volatile, nonvolatile, dynamic, static, read/write, read-only, random-access, sequential-access, location-addressable, file-addressable, and/or content-addressable devices.

It will be appreciated that storage machine 1004 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 1002 and storage machine 1004 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

When included, display subsystem 1006 may be used to present a visual representation of data held by storage machine 1004. This visual representation may take the form of a graphical user interface (GUI). As the herein described methods and processes change the data held by the storage machine, and thus transform the state of the storage machine, the state of display subsystem 1006 may likewise be transformed to visually represent changes in the underlying data. Display subsystem 1006 may include one or more display devices utilizing virtually any type of technology. Such display devices may be combined with logic machine 1002 and/or storage machine 1004 in a shared enclosure, or such display devices may be peripheral display devices.

When included, input subsystem 1008 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 1010 may be configured to communicatively couple computing system 1010 with one or more other computing devices. Communication subsystem 1010 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 1000 to send and/or receive messages to and/or from other devices via a network such as the Internet.

Another example provides a method of operating a time-of-flight camera system comprising an illumination source and an image sensor, the image sensor comprising one or more sensor pixels each comprising an in-pixel memory. The method comprises operating the illumination source and the image sensor to control a plurality of integration cycles and a plurality of readout cycles, during each integration cycle, performing a plurality of pulse width modulated (PWM) illumination cycles, each PWM illumination cycle separated from one or more adjacent PWM illumination cycles by a non-illumination cycle, during each PWM illumination cycle, directing photocharge to the in-pixel memory for each pixel that is performing image integration, and during each non-illumination cycle, conducting photocharge away from the in-pixel memory for each pixel that is performing image integration, and during each readout cycle, for each pixel that performed image integration, reading a charge stored in the in-pixel memory after the integration cycle. In some examples, conducting the photocharge away from the in-pixel memory during each non-illumination cycle alternatively or additionally comprises draining the photocharge via an anti-blooming gate for each pixel that is performing image integration. In some examples, conducting the photocharge away from the in-pixel memory alternatively or additionally comprises draining the photocharge via a reset path. In some examples, performing one or more of the integration cycles alternatively or additionally comprises performing the one or more of the integration cycles at a frequency in a range of between 50 kHz and 5 MHz. In some examples, each PWM illumination cycle alternatively or additionally comprises a frequency modulated light signal. In some such examples, the frequency modulated light signal alternatively or additionally comprises a random phase encoding.

Another example provides a time-of-flight camera system comprising an illumination source, an image sensor comprising one or more sensor pixels each comprising an in-pixel memory, a logic subsystem, and a memory comprising instructions executable by the logic subsystem. The instructions executable to operate the illumination source and the image sensor to control a plurality of integration cycles and a plurality of readout cycles, during each integration cycle, perform a plurality of pulse width modulated (PWM) illumination cycles, each PWM illumination cycle separated from one or more adjacent PWM illumination cycles by a non-illumination cycle, during each PWM illumination cycle, direct photocharge to the in-pixel memory for each pixel that is performing image integration, and during each non-illumination cycle, conduct photocharge away from the in-pixel memory for each pixel that is performing image integration, and during each readout cycle, for each pixel that performed image integration, read a charge stored in the in-pixel memory after the integration cycle. In some examples, one or more sensor pixels alternatively or additionally comprises an anti-blooming gate, and the instructions executable to conduct the photocharge away from the in-pixel memory are alternatively or additionally executable to drain the photocharge via the anti-blooming gate for each pixel that is performing image integration. In some examples, the instructions executable to conduct the photocharge away from the in-pixel memory are alternatively or additionally executable to drain the photocharge via a reset path for each pixel that is performing image integration. In some examples, the instructions executable to perform one or more of the integration cycles are alternatively or additionally executable to perform at a frequency in a range of between 50 kHz and 5 MHz. In some examples, the instructions are alternatively or additionally executable to perform one or more PWM illumination cycles comprising a frequency modulated light signal. In some examples, the instructions alternatively or additionally are executable to encode a random phase for the frequency modulated light signal. In some examples, the instructions are alternatively or additionally executable to operate at least the illumination source and the image sensor within a bandwidth of a connected power source.

Yet another example provides a time-of-flight camera system comprising an illumination source, an image sensor comprising one or more sensor pixels each comprising an in-pixel memory, a logic subsystem, and a memory comprising instructions executable by the logic subsystem. The instructions are executable to operate the illumination source and the image sensor to control a plurality of integration cycles and a plurality of readout cycles, during each integration cycle, perform a plurality of pulse width modulated (PWM) illumination cycles, each PWM illumination cycle separated from one or more adjacent PWM illumination cycles by a non-illumination cycle, during each PWM illumination cycle, direct photocharge to the in-pixel memory for each pixel that is performing image integration, and during each readout cycle, for each pixel that performed image integration, read a charge stored in the in-pixel memory after the image integration. In some examples, the instructions are alternatively or additionally executable to, during each non-illumination cycle, operate the image sensor in a reset mode. In some examples, the instructions are alternatively or additionally executable to perform one or more of the integration cycles at a frequency in a range of between 50 kHz and 5 MHz. In some examples, the instructions are alternatingly or additionally executable to, during each non-illumination cycle, conduct the photocharge away from the in-pixel memory. In some examples, each pixel of the plurality of pixels alternatively or additionally comprises an anti-blooming gate and the instructions are alternatively or additionally executable to drain the photocharge via the anti-blooming gate for each pixel that is performing image integration. In some examples, the instructions are alternatively or additionally executable to drain the photocharge via a reset path for each pixel that is performing image integration. In some examples, the instructions are alternatively or additionally executable to operate at least the illumination source and the image sensor within a bandwidth of a connected power source.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method of operating a time-of-flight camera system comprising an illumination source and an image sensor, the image sensor comprising one or more sensor pixels each comprising an in-pixel memory, the method comprising:
    operating the illumination source and the image sensor to control a plurality of integration cycles for a readout cycle by
        performing a plurality of pulse width modulated (PWM) illumination cycles, each PWM illumination cycle separated from one or more adjacent PWM illumination cycles by a non-illumination cycle,
        temporally modulating the illumination source during each PWM illumination cycle to emit temporally modulated light, the temporally modulated light being at different frequencies for at least two different PWM illumination cycles,
        during each PWM illumination cycle, directing photocharge to the in-pixel memory for each pixel that is performing image integration, and
        during each non-illumination cycle, conducting photocharge away from the in-pixel memory for each pixel that is performing image integration; and
    during the readout cycle, for each pixel that performed image integration, reading a charge stored in the in-pixel memory.

2. The method of claim 1, wherein conducting the photocharge away from the in-pixel memory during each non-illumination cycle comprises draining the photocharge via an anti-blooming gate for each pixel that is performing image integration.

3. The method of claim 1, wherein conducting the photocharge away from the in-pixel memory comprises draining the photocharge via a reset path.

4. The method of claim 1, wherein temporally modulating the illumination source comprises temporally modulating the illumination source at a frequency in a range of between 50 kHz and 5 MHz.

5. The method of claim 4, wherein each PWM illumination cycle further comprises a frequency modulated light signal.

6. The method of claim 5, wherein the frequency modulated light signal comprises a random phase encoding.

7. A time-of-flight camera system comprising:
    an illumination source;
    an image sensor comprising one or more sensor pixels each comprising an in-pixel memory;
    a logic subsystem; and
    a memory comprising instructions executable by the logic subsystem to
        operate the illumination source and the image sensor to control a plurality of integration cycles for a readout cycle, wherein during each integration cycle, the instructions are executable to
            perform a plurality of pulse width modulated (PWM) illumination cycles, each PWM illumination cycle separated from one or more adjacent PWM illumination cycles by a non-illumination cycle,
            temporally modulate the illumination source during each PWM illumination cycle to emit temporally modulated light, the temporally modulated light being modulated at different frequencies for at least two different PWM illumination cycles,
            during each PWM illumination cycle, direct photocharge to the in-pixel memory for each pixel that is performing image integration, and
            during each non-illumination cycle, conduct photocharge away from the in-pixel memory for each pixel that is performing image integration, and
        during the readout cycle, for each pixel that performed image integration, read a charge stored in the in-pixel memory.

8. The system of claim 7, wherein one or more sensor pixels further comprises an anti-blooming gate and wherein the instructions executable to conduct the photocharge away from the in-pixel memory are executable to drain the photocharge via the anti-blooming gate for each pixel that is performing image integration.

9. The system of claim 7, wherein the instructions executable to conduct the photocharge away from the in-pixel memory are executable to drain the photocharge via a reset path for each pixel that is performing image integration.

10. The system of claim 7, wherein the instructions executable to temporally modulate the illumination source comprise instructions executable to temporally modulate the illumination source at a frequency in a range of between 50 kHz and 5 MHz.

11. The system of claim 10, wherein the instructions executable to perform a plurality of PWM illumination cycles are further executable to perform one or more PWM illumination cycles comprising a frequency modulated light signal.

12. The system of claim 11, wherein the instructions executable to perform a plurality of PWM illumination cycles is further executable to encode a random phase for the frequency modulated light signal.

13. The system of claim 7, wherein the instructions executable to operate the illumination source and the image sensor to control a plurality of integration cycles for the readout cycle are further executable to operate at least the illumination source and the image sensor within a bandwidth of a connected power source.

14. A time-of-flight camera system comprising:
    an illumination source;
    an image sensor comprising one or more sensor pixels each comprising an in-pixel memory;
    a logic subsystem; and
    a memory comprising instructions executable by the logic subsystem to
        operate the illumination source and the image sensor to control a plurality of integration cycles for a readout cycle, wherein during each integration cycle, the instructions are executable to
  perform a plurality of pulse width modulated (PWM) illumination cycles, each PWM illumination cycle separated from one or more adjacent PWM illumination cycles by a non-illumination cycle,
  temporally modulate the illumination source during each PWM illumination cycle to emit temporally modulated light, the temporally modulated light being modulated at different frequencies for at least two different PWM illumination cycles,
  during each PWM illumination cycle, direct photocharge to the in-pixel memory for each pixel that is performing image integration; and
 during the readout cycle, for each pixel that performed image integration, read a charge stored in the in-pixel memory.

15. The system of claim 14, wherein the instructions to operate the illumination source and the image sensor to control a plurality of integration cycles for the readout cycle are further executable to, during each non-illumination cycle, operate the image sensor in a reset mode.

16. The system of claim 14, wherein the instructions executable to temporally modulate the illumination source comprise instructions executable to temporally modulate the illumination source at a frequency in a range of between 50 kHz and 5 MHz.

17. The system of claim 14, wherein the instructions to operate the illumination source and the image sensor to control a plurality of integration cycles for the readout cycle are further executable to, during each non-illumination cycle, conduct the photocharge away from the in-pixel memory.

18. The system of claim 17, wherein each pixel of the plurality of pixels further comprises an anti-blooming gate and wherein the instructions executable to conduct the photocharge away from the in-pixel memory are executable to drain the photocharge via the anti-blooming gate for each pixel that is performing image integration.

19. The system of claim 17, wherein the instructions executable to conduct the photocharge away from the in-pixel memory are executable to drain the photocharge via a reset path for each pixel that is performing image integration.

20. The system of claim 14, wherein the instructions executable to operate the illumination source and the image sensor to control a plurality of integration cycles for the readout cycle are further executable to operate at least the illumination source and the image sensor within a bandwidth of a connected power source.

* * * * *